(12) United States Patent
Kalavakuru et al.

(10) Patent No.: US 12,136,959 B2
(45) Date of Patent: Nov. 5, 2024

(54) REAL-TIME RADIO SELF-CALIBRATION

(71) Applicant: Cisco Technology, Inc., San Jose, CA (US)

(72) Inventors: Sivadeep Kalavakuru, Akron, OH (US); Fred Anderson, Lakeville, OH (US); Xiangxiang Fang, San Diego, CA (US); Ardalan Alizadeh, Milpitas, CA (US)

(73) Assignee: Cisco Technology, Inc.

( * ) Notice: Subject to any disclaimer, the term of this patent is extended or adjusted under 35 U.S.C. 154(b) by 38 days.

(21) Appl. No.: 18/191,553

(22) Filed: Mar. 28, 2023

(65) Prior Publication Data
US 2024/0333404 A1  Oct. 3, 2024

(51) Int. Cl.
*H04B 17/11* (2015.01)
*H04L 1/00* (2006.01)
*H04W 52/52* (2009.01)

(52) U.S. Cl.
CPC ............ *H04B 17/11* (2015.01); *H04L 1/0003* (2013.01); *H04W 52/52* (2013.01)

(58) Field of Classification Search
CPC . H04L 2001/0093; H04L 65/70; H04L 1/189; H04L 65/1101; H04L 12/2838; H04L 2012/2841; H04L 2012/2849; H04L 63/0853; H04W 84/18; H04W 92/02; H04W 28/22; H04W 24/00; H04W 88/18; H04W 24/08; H04W 40/22; H04W 16/32; H04B 7/0617; H04B 7/10; H04B 17/14; H04B 17/12; H04B 1/40; H04B 1/71637; H04B 1/719; H04B 1/04; H04B 1/3827

USPC .......................................................... 375/219
See application file for complete search history.

(56) References Cited

U.S. PATENT DOCUMENTS

| | | | |
|---|---|---|---|
| 10,911,162 B1 * | 2/2021 | Agrawal | H04B 17/11 |
| 12,021,571 B2 * | 6/2024 | Huang | H04B 17/21 |
| 2005/0159116 A1 | 7/2005 | Xiong | |
| 2006/0199552 A1 | 9/2006 | Blech et al. | |
| 2012/0034893 A1 * | 2/2012 | Baxter | H03G 3/3042 |
| | | | 455/234.1 |
| 2012/0088510 A1 | 4/2012 | Akhi et al. | |
| 2012/0264378 A1 * | 10/2012 | Steele | H04B 17/13 |
| | | | 455/73 |
| 2013/0094553 A1 * | 4/2013 | Paek | H03F 3/193 |
| | | | 375/296 |
| 2013/0162349 A1 * | 6/2013 | Gao | H03G 1/0005 |
| | | | 330/75 |
| 2013/0264378 A1 * | 10/2013 | Keberlein | B65D 5/2033 |
| | | | 229/122 |
| 2019/0123702 A1 | 4/2019 | Trainor et al. | |
| 2022/0094072 A1 | 3/2022 | Kalavakuru et al. | |

\* cited by examiner

*Primary Examiner* — Eva Y Puente
(74) *Attorney, Agent, or Firm* — Merchant & Gould P.C.

(57) ABSTRACT

Real-time radio self-calibration may be provided. The self-calibration may begin by sampling a Transmission (TX) signal. An achievable Error Vector Magnitude (EVM) for one or more frames may be determined based on the TX signal. Link budgets for clients may be determined using a TX power and a supported Modulation and Coding Scheme (MCS). A per packet TX power is adjusted based on the achievable EVM and a TX retry rate. The PA linearity of the radio may also be adjusted based on the achievable EVM and the link budget. The client may be regrouped into a new MCS based on the link budget.

20 Claims, 4 Drawing Sheets

REAL-TIME RADIO SELF-CALIBRATION

TECHNICAL FIELD

The present disclosure relates generally to providing real-time radio self-calibration.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
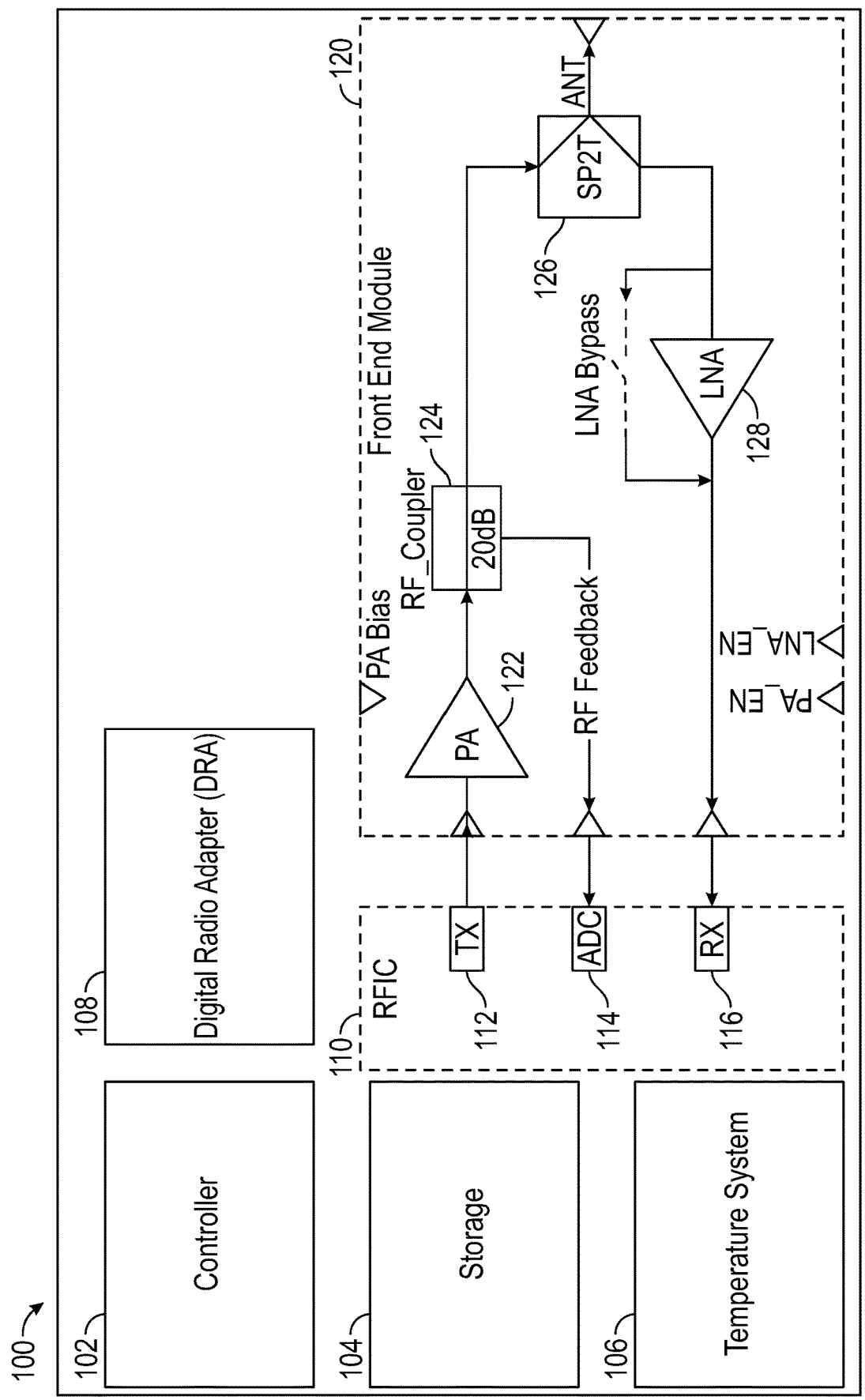
FIG. 1 is a block diagram of a radio for real-time radio self-calibration.

Real-time radio self-calibration may be provided. The self-calibration may begin by sampling a Transmission (TX) signal. An achievable Error Vector Magnitude (EVM) for one or more frames may be determined based on the TX signal. Link budgets for clients may be determined using a TX power and a supported Modulation and Coding Scheme (MCS). A per packet TX power is adjusted based on the achievable EVM and a TX retry rate. The PA linearity of the radio may also be adjusted based on the achievable EVM and the link budget. The client may be regrouped into a new MCS based on the link budget.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the advent of Wi-Fi 6 and Wi-Fi 7 an Access Point (AP) may support up to sixteen Transmit (TX)/Receive (RX) chains. APs having this higher number of radios and operating at higher Quadrature Amplitude Modulation (QAM) (e.g., 1K or 4K QAM) may be beneficial by improving system throughput, serving a higher number of clients, TX/RX diversity, and the like. In order to sustain a higher QAM, radios may need to be operating at a high linearity point with less than forty decibels (dB) of Error Vector Magnitude (EVM).

Front End Module (FEM) Power Amplifier (PA) Linearity (e.g., EVM, Front End (FE) Gain) may roll off frequency is increased. Additionally, EVM may be distorted at higher temperatures compared to room temperature (e.g., EVM degraded two to three dB across the Modulation and Coding Scheme (MCS) at fifty degrees Celsius). Moreover, EVM may vary over larger sample units.

To maintain EVM over MCS for devices such as APs, especially at higher QAMs, TX power may be reduced. For example, TX power may be reduced to ensure a larger quantity of units are passing with required EVM at certain frequencies and Bandwidths (BWs). Radio calibration at time of production may require radio TX power to meet 4 sigma limits (e.g., a Process Capability Index (CpK) of 1.33), or three to four decibels (dB) TX power back off.

TX EVM back-off may also be caused for Multi-User Multiple-Input and Multiple-Output (MU MIMO) and Space-Time Block Coding (STBC). A singular TX power may be statically set and/or limited over MCS in board data files (BDF) and EVM tables to cover worst case EVM requirements for BW, channel, temperature, and MU-MIMO. The static TX power limits may bottleneck TX power and may result in suboptimal Rate versus Range (RvR) performance in the Wireless Local Area Network (WLAN) in real time. Systems and methods to improve Radio Frequency (RF) performance (e.g., improve TX Power, improve EVM) by radio self-calibration through optimizing per packet transmit power is described herein. The systems and methods may use a Heuristic approach by TX Sampling and/or considering rate adaptation for link budget on a per client basis.

FIG. 1 is a block diagram of a radio 100 for real-time radio self-calibration. The radio 100 may include a controller 102, a storage 104, a temperature system 106, a Diameter Routing Agent (DRA) 108, a Radio Frequency Integrated Circuit (RFIC) 110, and a front end module 120. The RFIC 110 may include a Transmit (TX) module 112, an Analog to Digital Converter (ADC) 114, and a Receive (RX) module 116. The front end module 120 may include a Power Amplifier (PA) 122, a Radio Frequency (RF) coupler 124, a switch 126, and a Low Noise Amplifier (LNA) 128. The radio 100 may be an AP or part of an AP in some examples. For example, an AP may have multiple radios (e.g., three radios), such as the radio 100. Thus, in some examples, components of the radio 100 (e.g., the controller 102, the storage 104, the temperature system 106) may be components of an AP the radio 100 is a component of rather than of the radio 100 itself as shown in FIG. 1, and the controller 102 may cause multiple radios to self-calibrate.

The storage 104 may store a Board Data File (BDF). The BDF may include data for TX power limits for different BWs, frequencies, temperatures, and/or the like. The controller 102 may reference the BDF to determine the target TX power for the radio 100. The storage 104 may also store an EVM table. The EVM table may include data for TX power limits for different BWs, data rates, and/or the like. The controller 102 may reference the EVM table to determine the target TX power for the radio 100 to meet EVM requirements. Thus, the controller 102 may reference the BDF and/or the EVM table to determine the target TX power for the radio 100.

The temperature system 106 may monitor the operating temperature of the radio 100. For example, the temperature system may monitor the operating temperature of the RFIC 110, and the front end module 120. The temperature system may also monitor components of the RFIC 110 (e.g., the TX module 112, the ADC 114, the RX module 116) and the front end module 120 (e.g., the PA 122). The controller 102 may receive the operating temperatures determined by the temperature system 106.

The DRA 108 may provide real-time routing capabilities so communications are routed among the correct elements in the network. The DRA 108 may shift the data rate of the radio 100 based on the radio's 100 operation. For example, the DRA 108 may shift the data rate down due to MCS instability. In some examples, the DRA 108 may be an external system (e.g., on an AP, on a WLAN controller).

The RFIC 110 may transmit and receive radio waves. For example, the TX module 112 may send TX signals, and the RX module 116 may receive RX signals. When the TX module 112 sends a TX signal, the TX signal may pass through the PA 122, and the PA 122 may amplify the TX signal. The amplified TX signal may proceed to the switch 126 and be transmitted by an antenna. Additionally, the amplified TX signal passes through the RF coupler 124 between the PA 122 and the switch 126. The RF coupler 124 may sample the amplified TX signal and send the sample to the ADC 114. The ADC 114 may convert the sample to a digital TX signal. The digital TX signal may represent the analog amplified TX signal. The controller 102 may receive or otherwise access digital TX signals generated by the ADC 114. The storage 104 may store the digital TX signals, and the controller 102 may access the digital TX signals stored by the storage 104.

The controller 102 may evaluate the TX signals sent from the TX module 112 using the digital TX signals. The controller 102 may calibrate the radio using the digital TX signals, by causing the TX module 112 to adjust TX power for example. Because the controller 102 evaluates the TX signal after the TX signal passes through the PA 122, the controller 102 may take the PA non-linearity into account when calibrating the radio 100. The controller 102 may also consider generic line losses, frame type, the PA 122 bias condition, and/or the like when calibrating the radio 100.

Figure 2:
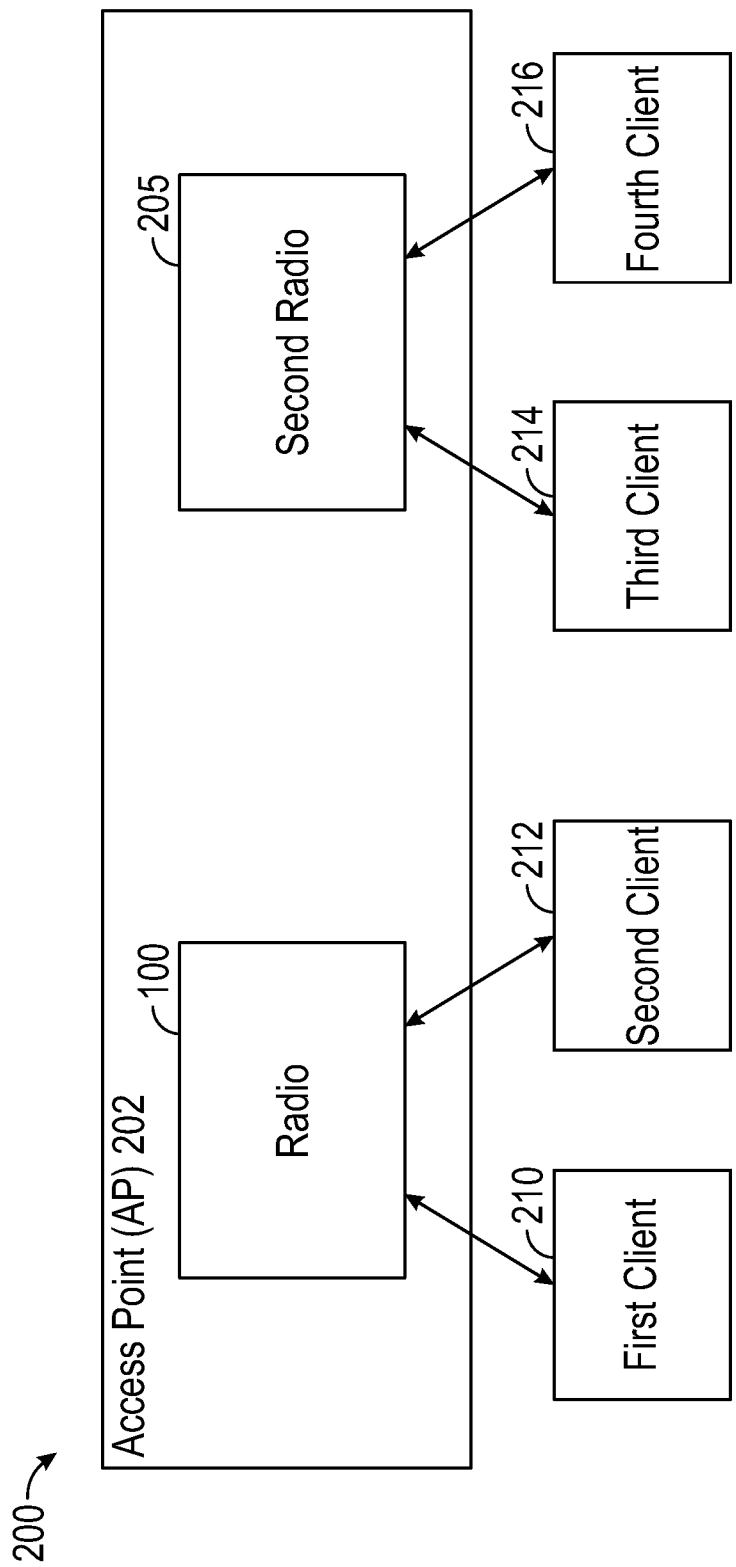
FIG. 2 is a block diagram of an operating environment for real-time radio self-calibration.

FIG. 2 is a block diagram of an operating environment 200 for real-time radio self-calibration. The operating environment 200 may include an AP 202, the radio 100 shown in FIG. 1, a second radio 205, a first client 210, a second client 212, a third client 214, and a fourth client 216. The second radio 205 may have the components of the radio 100 as shown in FIG. 1. Additionally, the controller 102 may be a component of the AP 202 rather than the radio 100 as shown in FIG. 1. The controller 102 may cause the radio 100 and the second radio 205 to self-calibrate or a the controller 102 may cause the radio 100 to calibrate and a second controller may cause the second radio 205 to self-calibrate. In the example illustrated by FIG. 2, the radio 100 and the second radio 205 are part of the AP 202. In another example, the radio 100 is part of a first AP and the second radio 205 is part of a second AP. The radio 100 may be assigned to or otherwise be communicating with the first client 210 and the second client 212. The second radio 205 may be assigned to or otherwise be communicating with the third client 214 and the fourth client 216.

Each TX signal may have a Single User (SU) or Multi User (MU) frame type. For example, the radio 100 may send a TX to just the first client 210 or just the second client, and the TX would be an SU frame type. The radio may send a TX to the first client 210 and the second client 212 simultaneously, and the TX would be an MU frame type. The radio 100 and/or the second radio 205 may operate according to an MCS (e.g., from MCS0-MSC9). For example, the radio 100 may operate on an MCS based on the distance the clients are from the radio 100 (e.g., operating at a higher MCS the further a client the radio 100 is communicating with is).

Before a radio self-calibrates, the radio may determine TX power according to the BDF and/or the EVM table. The controller 102 and/or another device that evaluates the TX signals receive multiple TX signals for the MCS, frame type, PA bias condition, and/or the like to perform radio self-calibration. For example, the controller 102 may receive five digital TX signals from the RFIC 110 for each MCS and frame type to perform the radio calibration.

The radio 100, via the TX module 112, may send TX signals at a PA 122 bias for each frame type (e.g., SU, MU) at a certain MCS to evaluate the PA 122 non-linearity for the corresponding frames. The controller 102 may access the digital TX signals associated with the sent TX signals and demodulate the digital TX signals to determine the achievable EVM for each frame at a certain TX power. Based on the determined achievable EVM, the controller 102 may cause the TX module 112 to adjust input TX power. For example, the TX module 112 may adjust the TX power with a resolution of 0.5 dB over the entire dynamic range the TX module 112 may send signals (e.g., the lowest power signal to the highest power signal) to meet the targeted EVM depending on frame type. The controller 102 may adjust the targeted EVM based on the frame type. For example, the EVM required for MU may be higher than SU.

The controller 102 may adaptively cause the TX module 112 to meet different TX power limits for each MCS and/or frame type. For example, the controller 102 may continue to monitor the operation of the radio 100 as more TX signals are sent, and adjust the operation of the TX module 112 based on the evaluation of the subsequent digital TX signals that are generated. The controller 102 may adjust TX power in real-time depending on operation conditions of the PA 122 (e.g., PA Bias, Operating Temp, etc.) and/or other components of the radio 100. Real-time may be simultaneous or nearly simultaneous adjustments (e.g., adjustments within fifteen minutes of the TX signal evaluated). The real-time self-calibration of the radio 100 allows the radio to operate without adhering to the TX power limits of the BDF and/or EVM table. Thus, the radio 100 may avoid a constant EVM and/or TX Power back-off along with sigma 4 margin built-in.

In a downlink Orthogonal Frequency Division Multiple Access (OFDMA) multi-user scenario, multiple radios may serve clients in a single Physical Layer Protocol Data Unit (PPDU). The aggregated TX power in this scenario may be equal to the different powers allocated to the RUs, which may be serving clients in near and/or far groupings. Radio firmware may group long PPDU packets in order of 3 MCS rates (e.g., MCS0-1 to 3, MCS-4 to 6, etc.) to serve clients in certain groups at a distance. The long PPDU packets may be in a queue that need to cycle through all groupings, which may lead to latency. When clients are on a cell edge, a radio may need the send a TX at MCS0 and at high power to communicate with the clients, which may cause disadvantage to clients in the same grouping relatively near the radio linking up at lower MCS. Thus, the controller 102 may determine groupings of clients to reduce or eliminate these communication issues with clients as part of the self-calibration.

The controller 102, may identify the total number of clients connected for each radio (e.g., a radio operating on a 2.4 GHz band, a radio operating on a 5 GHz band, a radio operating on a 6 GHz band). For example, the controller 102 may identify the number of clients connected to the radio 100 (e.g., two: the first client 210 and the second client 212) and the number of clients connected to the second radio 205 (e.g., two: the third client 214 and the fourth client 216). In other examples, the radios may be connected to more clients (e.g., as many as fifty clients or more). For each client, the controller 102 may determine a link budget based on the TX power, such as the number of TX antennas, the number of RX antennas, and the number of Spatial Streams (SS) for the AP 202 and/or the radio connected to the client (e.g., TX:RX:(SS)), and the supported MCS. In an example, the controller 102 determines the TX power is 1.5 dB higher when the MCS increases by one (e.g., MCS2 to MCS 3). Thus, the controller 102 may apply a linear translation between relative MCS and TX power when grouping clients.

The controller 102 may determine client groupings for certain MCSs based on avoiding the potential grouping issues described above and at the TX power settings obtained by evaluating the TX signals and determining the achievable EVM as described above. The TX power settings obtained by evaluating the TX signals may have a higher probability clients to successfully demodulate based on link budget for each client. This method of grouping clients for an MCS based on achievable EVM at various TX powers while taking PA non-linearity into account for each group of near and far groupings of clients may increase link budgets and/or lead to fewer TX retries compared to set TX powers and/or EVM requirements (e.g., the requirements set by the BDF and/or the EVM table). The frequency, rate, and BW for the groupings may be selected by a Radio Resource Management (RRM).

In APs (e.g., the AP 202) and/or radios, the front end modules (e.g., the front end module 120) and/or the PAs (e.g., the PA 122) in 2.4 GHz, 5 GHZ, and 6 GHz chains may typically operate at a fixed PA bias (e.g., 3.3 Volts (V), 4.2 V, 5 V). The fixed PA bias may be set to provide 17 decibel-milliwatts (dBm) per TX chain in an indoor setting and provide 24 dBm per TX chain in an outdoor setting. The radios may also operate with a fixed RF performance (e.g., linearity) that corresponds to the PA operating state. If a client fails to demodulate signals at a higher MCS depending on the link budget of the client, a Diameter Routing Agent (DRA) rate may traditionally be shifted down (e.g., sending more TX retries). Shifting the DRA rate down may lead to lower throughput and/or MCS instability.

Based on the number of retries (i.e., DRA rate shifting down due to lack of MCS stability), the controller 102 may adjust TX power per frame. The adjustment to TX power may be based on the TX power settings obtained by evaluating the TX signals and determining the achievable EVM and in accordance with link budget needed. The controller may adjust the linearity of the PA 122 by causing the operating state of the PA 122 to change to adjust the TX power (e.g., via bias for higher MCS (1k and 4K QAM)). The adjustment to the TX power may provide additional EVM (linearity) to sustain higher QAM, thereby stabilizing the EVM in real-time.

The controller 102 may use an algorithm, such as a dynamic rate algorithm, to determine a stable rate for each client. The controller 102 may use the algorithm via different approaches (e.g., Frame Loss Rate (FLR) scores, Exponentially Weighted Moving Average (EWMA) scores, Multiple-Input and Multiple-Output (MIMO) blocks, credit based, Overlapping Basic Service Set/Preamble-Detection (OBSS-PD) with help of retries, etc.). Applying the TX power settings obtained by evaluating the TX signals and determining the achievable EVM and the determined client groupings as described above with the algorithm may improve the operation of the algorithm (e.g., improved FLR and EWMA scores). The controller 102 may run or otherwise trigger the algorithm per packet (e.g., for every new TX) or based on a radio configuration change (e.g., a TX power configuration change, a new client data rate set). The controller may use the algorithm to determine a TX power to obtain achievable EVM on a per packet basis, taking into account client link budgets and radio performance (e.g., operating temperature).

Figure 3:
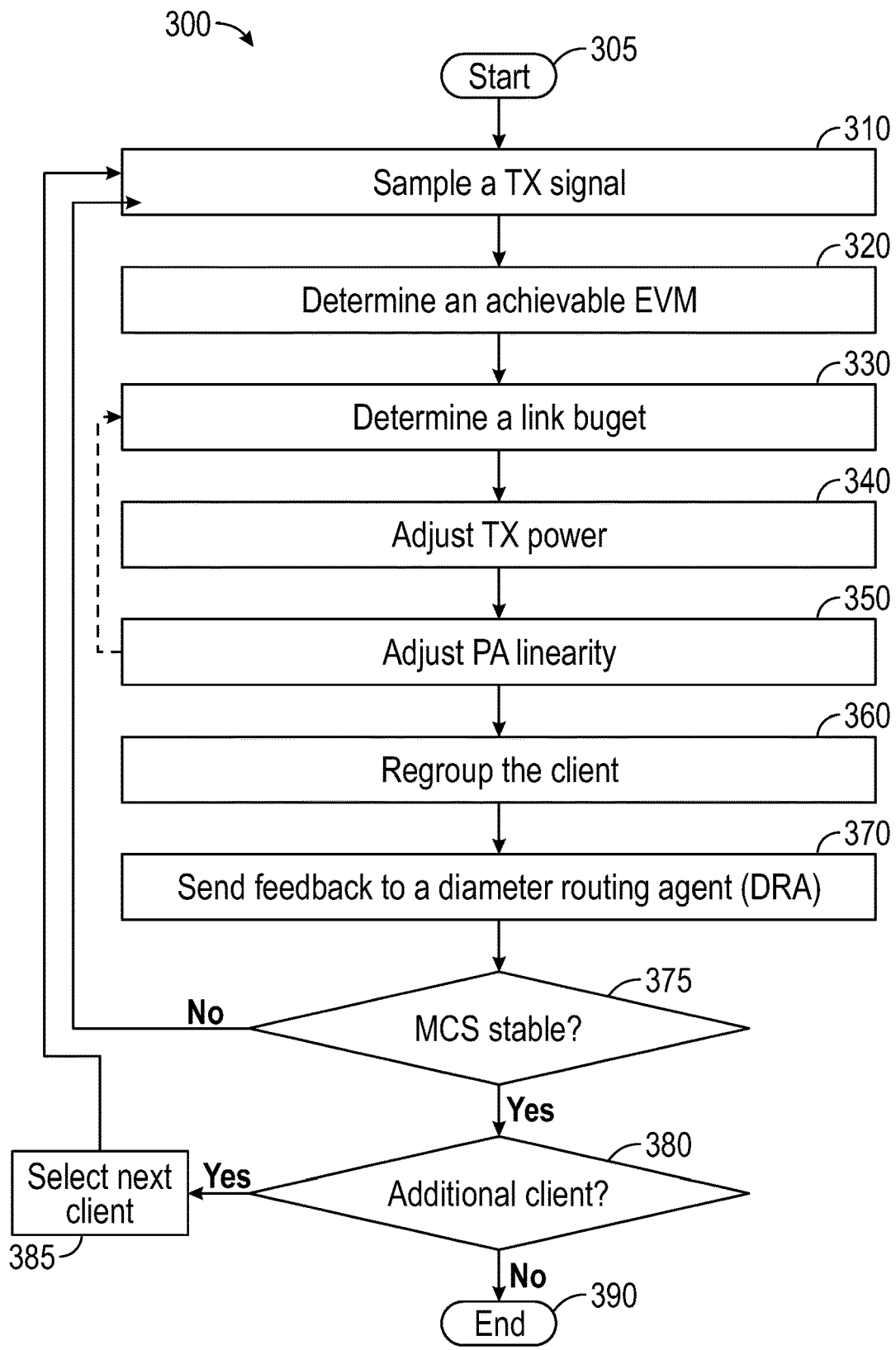
FIG. 3 is a flow chart of a method for real-time radio self-calibration.

FIG. 3 is a flowchart of a method for real-time radio self-calibration. The method 300 may be triggered per packet (e.g., for every new TX) or based on a radio configuration change (e.g., a TX power configuration change, a new client data rate set). The method 300 may be performed for each client connected to a radio. Thus, the method 300 may repeat until the operations are performed for each client and/or the operations of method 300 may be performed for each client sequentially.

The method may begin at starting block 305 and proceed to operation 310. The method 300 may be performed for a first client. In operation 310, a TX signal is sampled. For example, the TX module 112 may send a TX, the PA 122 may amplify the TX, and the RF coupler 124 may sample the amplified TX. The ADC 114 may receive the amplified TX and convert the amplified TX into a digital TX. The storage 104 may store the digital TX. TX signals for multiple TX power, each MCS and, frame type may be sampled.

In operation 320, an achievable EVM may be determined. For example, the controller 102 may evaluate the sampled TX signals from operation 810. Thus, the controller 102 may evaluate the TX signals for each MCS and frame type, and determine an achievable EVM for different TXs. The controller 102 may determine the achievable EVM according to the methods described above.

In operation 330, a link budget may be determined. For example, the controller 102 may determine the link budget for the client based on the TX power, such as the number of TX antennas, the number of RX antennas, and the number of SS for the AP 202 and/or the radio 100 (e.g., TX:RX:(SS)), and the supported MCS. The controller 102 may determine and consider the status of DRA 108 and TX scores (e.g, EWMA scores, FLR scores) when determining the link budget.

In operation 340, the TX power may be adjusted. For example, the controller 102 may cause the TX module 112 to adjust TX power (e.g., per packet adjustment of TX, such as for different MCS and frame types) based on the achievable EVM determined in operation 320 and/or the link budget determined in operation 330. The controller 102 may cause the TX power to be adjusted further based on TX retry rate when communicating the client. The retry rate may be monitored and controlled by the DRA 108.

In operation 350, the PA linearity may be adjusted. For example, the controller 102 may cause the PA 122 to adjust the PA linearity via bias. The controller 102 may cause the PA 122 to adjust the PA linearity based on the achievable EVM and/or the link budget. The adjusted PA linearity may allow the radio 100 to achieve a higher QAM.

In operation 360, the client may be regrouped. For example, the controller 102 may group the client in a new group with a new MCS based on the achievable EVM and/or link budget.

In operation 370, feedback may be sent to the DRA 108. For example, the controller 102 may send the DRA 108 the achievable EVM, the link budget, and/or the adjusted PA linearity. The DRA 108 may evaluate the feedback to determine whether to adjust the operation of the radio 100 (e.g., shifting the data rate higher or lower).

In decision 375, it may be determined whether the MCS is stable. For example, the controller 102 and/or the DRA 108 may determine whether the MCS is stable for communicating with the client. The stability may be based on sending TXs according to the achievable EVM, the link budget, and the adjusted PA linearity.

If the MCS is not stable, the method 300 may proceed to operation 310, and the operations may be performed again for the client until the MCS is stable. If the MCS is stable, the method 300 may proceed to decision 380.

In decision 380, is may be determined whether there is an additional client to evaluate for self-calibration. If there is an additional client, the method 300 may proceed to operation 385, and a next client may be selected. The method 300 may then proceed to operation 310, and the operations may occur for the next client. If there is not an additional client, self-calibration may be complete and the method 300 may conclude at ending block 390. Thus, the operations of method 300 may be performed for multiple clients to adjust the operation of the radio 100.

Figure 4:
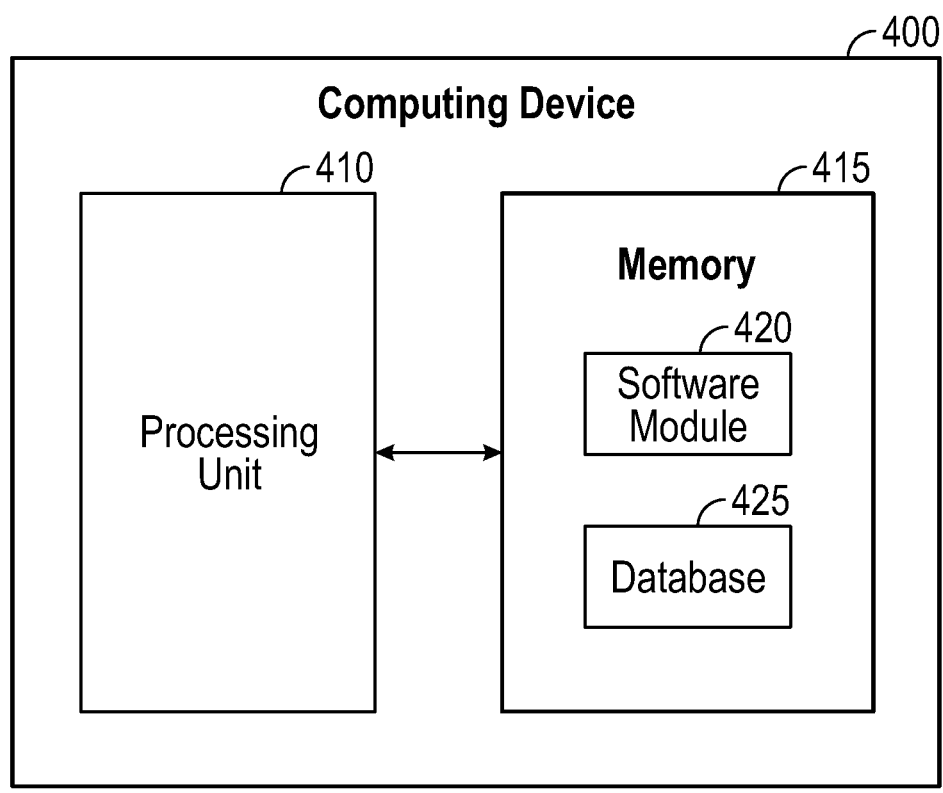
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for real-time radio self-calibration with respect to FIG. 1, FIG. 2, and FIG. 3. Computing device 400, for example, may provide an operating environment for the controller 102, the storage 104, the temperature system 106, the DRA 108, the RFIC 110, the TX module 112, the ADC 114, the RX module 116, the front end module 120, the PA 122, the RF coupler 124, the switch 126, the LNA 128, the AP 202, the second radio 205, the first client 210, the second client 212, the third client 214, the fourth client 216, and the like. The controller 102, the storage 104, the temperature system 106, the DRA 108, the RFIC 110, the TX module 112, the ADC 114, the RX module 116, the front end module 120, the PA 122, the RF coupler 124, the switch 126, the LNA 128, the AP 202, the second radio 205, the first client 210, the second client 212, the third client 214, the fourth client 216, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
for one or more clients of a radio:
sampling a Transmission (TX) signal;
determining an achievable Error Vector Magnitude (EVM) for one or more frames based on the TX signal;
determining a link budget using a TX power and a supported Modulation and Coding Scheme (MCS);
adjusting a per packet TX power based on the achievable EVM and a TX retry rate;
adjusting a PA linearity of the radio based on the achievable EVM and the link budget; and
regrouping the client into a new MCS based on the link budget.

2. The method of claim 1, further comprising:
sending feedback to a Diameter Routing Agent (DRA); and
determining whether the MCS is stable based on an evaluation of the feedback by the DRA.

3. The method of claim 1, wherein the TX retry rate is based on MCS stability.

4. The method of claim 1, wherein the TX signal is amplified by a Power Amplifier (PA).

5. The method of claim 1, further comprising, determining a radio performance including an operating temperature of the radio, wherein adjusting the per packet TX power is based on the radio performance.

6. The method of claim 1, further comprising determining a stable rate for each client based on the achievable EVM and the link budget.

7. The method of claim 1, further comprising,
determining any one of a new packet occurs or a radio configuration change occurs; and
reevaluating any one of (i) the achievable EVM, (ii) link budgets, (iii) per packet TX power, (iv) PA linearity, (v) client groupings, or (vi) any combination of (i)-(v) based on determining any one of the new packet occurs or the radio configuration change occurs.

8. A system comprising:
a memory storage; and
a processing unit coupled to the memory storage, wherein the processing unit is operative to:
for one or more clients of a radio:
sample a Transmission (TX) signal;
determine an achievable Error Vector Magnitude (EVM) for one or more frames based on the TX signal;
determine a link budget using a TX power and a supported Modulation and Coding Scheme (MCS);
adjust a per packet TX power based on the achievable EVM and a TX retry rate;
adjust a PA linearity of the radio based on the achievable EVM and the link budget; and
regroup the client into a new MCS based on the link budget.

9. The system of claim 8, the processing unit being further operative to:
send feedback to a Diameter Routing Agent (DRA); and
determine whether the MCS is stable based on an evaluation of the feedback by the DRA.

10. The system of claim 8, wherein the TX retry rate is based on MCS stability.

11. The system of claim 8, wherein the TX signal is amplified by a Power Amplifier (PA).

12. The system of claim 8, the processing unit being further operative to:
determine a radio performance including an operating temperature of the radio, wherein to adjust the per packet TX power is based on the radio performance.

13. The system of claim 8, the processing unit being further operative to: determine a stable rate for each client based on the achievable EVM and the link budget.

14. The system of claim 8, the processing unit being further operative to:
determine any one of a new packet occurs or a radio configuration change occurs; and
reevaluate any one of (i) the achievable EVM, (ii) link budgets, (iii) per packet TX power, (iv) PA linearity, (v) client groupings, or (vi) any combination of (i)-(v) based on determining any one of the new packet occurs or the radio configuration change occurs.

15. A non-transitory computer-readable medium that stores a set of instructions which when executed perform a method executed by the set of instructions comprising:
for one or more clients of a radio:
sampling a Transmission (TX) signal;
determining an achievable Error Vector Magnitude (EVM) for one or more frames based on the TX signal;
determining a link budget using a TX power and a supported Modulation and Coding Scheme (MCS);
adjusting a per packet TX power based on the achievable EVM and a TX retry rate;
adjusting a PA linearity of the radio based on the achievable EVM and the link budget; and
regrouping the client into a new MCS based on the link budget.

16. The non-transitory computer-readable medium of claim 15, the method executed by the set of instructions further comprising:
sending feedback to a Diameter Routing Agent (DRA); and
determining whether the MCS is stable based on an evaluation of the feedback by the DRA.

17. The non-transitory computer-readable medium of claim 15, wherein the TX retry rate is based on MCS stability.

18. The non-transitory computer-readable medium of claim 15, wherein the TX signal is amplified by a Power Amplifier (PA).

19. The non-transitory computer-readable medium of claim 15, the method executed by the set of instructions further comprising:
determining a stable rate for each client based on the achievable EVM and the link budget.

20. The non-transitory computer-readable medium of claim 15, the method executed by the set of instructions further comprising:
determining any one of a new packet occurs or a radio configuration change occurs; and
reevaluating any one of (i) the achievable EVM, (ii) link budgets, (iii) per packet TX power, (iv) PA linearity, (v) client groupings, or (vi) any combination of (i)-(v) based on determining any one of the new packet occurs or the radio configuration change occurs.

\* \* \* \* \*